United States Patent
Price et al.

(10) Patent No.: US 9,801,043 B2
(45) Date of Patent: *Oct. 24, 2017

(54) ADAPTABLE NETWORK SERVICE ACCESS THROUGH DYNAMIC REQUEST ROUTING

(71) Applicant: Apple Inc., Cupertino, CA (US)

(72) Inventors: David Price, Reading (GB); Alan Darbyshire, Oxford (GB); Ricky Kaura, Uxbridge (GB)

(73) Assignee: Apple Inc., Cupertino, CA (US)

( * ) Notice: Subject to any disclaimer, the term of this patent is extended or adjusted under 35 U.S.C. 154(b) by 531 days.

This patent is subject to a terminal disclaimer.

(21) Appl. No.: 14/467,122

(22) Filed: Aug. 25, 2014

(65) Prior Publication Data

US 2015/0055558 A1 Feb. 26, 2015

Related U.S. Application Data

(63) Continuation of application No. 11/687,358, filed on Mar. 16, 2007, now Pat. No. 8,819,181.

(60) Provisional application No. 60/783,774, filed on Mar. 17, 2006.

(51) Int. Cl.
  *G06F 15/16* (2006.01)
  *H04W 8/18* (2009.01)
  *H04L 29/12* (2006.01)
  *H04L 29/06* (2006.01)

(52) U.S. Cl.
  CPC ......... *H04W 8/183* (2013.01); *H04L 29/1282* (2013.01); *H04L 29/12132* (2013.01); *H04L 29/12188* (2013.01); *H04L 61/1552* (2013.01); *H04L 61/1588* (2013.01);
  (Continued)

(58) Field of Classification Search
  CPC ......... H04L 29/12132; H04L 29/12188; H04L 29/1282; H04L 61/1552; H04L 61/1588; H04L 61/6013; H04L 65/1016; H04L 65/1073; H04L 65/1006; H04W 8/183
  See application file for complete search history.

(56) References Cited

U.S. PATENT DOCUMENTS

| 6,389,462 | B1 * | 5/2002 | Cohen ..................... H04L 29/06 707/999.01 |
| 8,200,837 | B1 * | 6/2012 | Bhatti ..................... H04L 67/02 709/219 |
| 8,819,181 | B2 | 8/2014 | Price et al. |

(Continued)

OTHER PUBLICATIONS

"3GPP TS 23.228 V5.14.0". 3$^{rd}$ Generation Partnership Project. Sep. 2005. Pages 1-131.*

(Continued)

*Primary Examiner* — Christopher Biagini
(74) *Attorney, Agent, or Firm* — Meyertons, Hood, Kivlin, Kowert & Goetzel, P.C.

(57) ABSTRACT

In an Internet Protocol Multimedia Subsystem (IMS) network in which multiple subscriber data servers are deployed with partitioned subscription data for users, a subscriber location function (SLF) is used to proxy queries to a subscriber data server (such as an HSS) in which subscription data for a user can be found. The SLF receives a query for the subscriber data server, looks up the address of appropriate subscriber data server and proxies the query to the appropriate subscriber data server. Preferably, the SLF is co-located with a subscriber data server.

20 Claims, 7 Drawing Sheets

(52) U.S. Cl.
CPC ...... *H04L 61/6013* (2013.01); *H04L 65/1016* (2013.01); *H04L 65/1073* (2013.01)

(56) References Cited

U.S. PATENT DOCUMENTS

| | | | |
|---|---|---|---|
| 2003/0065953 A1* | 4/2003 | Lehmann | H04L 63/0281 726/12 |
| 2004/0088419 A1* | 5/2004 | Westman | H04L 29/06 709/227 |
| 2004/0193700 A1 | 9/2004 | Westman et al. | |
| 2004/0246965 A1 | 12/2004 | Westman et al. | |
| 2006/0067338 A1* | 3/2006 | Hua | H04L 29/06 370/400 |
| 2006/0136557 A1 | 6/2006 | Schaedler et al. | |
| 2007/0005777 A1* | 1/2007 | Fremantle | H04L 67/2804 709/228 |
| 2007/0180113 A1* | 8/2007 | Van Bemmel | H04L 67/1008 709/226 |

OTHER PUBLICATIONS

"3GPP TS 29.228 V6.8.0". 3$^{rd}$ Generation Partnership Project. Sep. 2005. pp. 1-54.*

"Apache's features to manipulate URL's". Akadia.com. Archived on Feb. 18, 2005 by the Internet Archive: <http://web.archive.org/web/20050218093455/http://www.akadia.com/services/apache_redirect.html>. pp. 1-3.*

"Module mod_rewrite". Apache Software Foundation. Archived on Jan. 11, 1998 by the Internet Archive: <http://web.archive.org/web/19980111100041/www.apache.org/docs/mod/mod_rewrite.html>. pp. 1-13.*

3rd Generation Partnership Project; Technical Specification Group Services and System Aspects; Multimedia telephony over IP Multimedia Subsystem (IMS); Optimization opportunities (Release 7), 3GPP TR 26.914 V7.0.0 (Mar. 2006).

Polidoro, A.; Salsano, S.; Bartolomeo, G., "Simple Mobile Services for IMS," Next Generation Mobile Applications, Services and Technologies, 2008. NGMAST '08. The Second International Conference on , vol., No., pp. 184-189, Sep. 16-19, 2008.

* cited by examiner

ADAPTABLE NETWORK SERVICE ACCESS THROUGH DYNAMIC REQUEST ROUTING

CROSS-REFERENCE TO RELATED APPLICATIONS

This application is a continuation of U.S. patent application Ser. No. 11/687,358, filed Mar. 16, 2007, which claims priority to U.S. Provisional Application Ser. No. 60/783,774, filed Mar. 17, 2006, the entirety of which are incorporated herein by reference.

FIELD OF THE INVENTION

The present invention relates to methods of, systems for, computer programs for and apparatus for routing subscriber data queries in a communications network using the Internet Protocol (IP) Multimedia Subsystem (IMS). More particularly, the present invention relates to methods of, systems for, computer programs for and apparatus for routing subscriber data queries in a communications network using the IMS in which a subscriber data (for example subscriber data stored in a Home Subscriber Server (HSS)) is partitioned over several different subscriber data servers or functions.

BACKGROUND OF THE INVENTION

The IMS is an architecture for enabling the provision of IP based multimedia services in 3G and subsequent mobile and converged fixed/mobile communications networks. Features of IMS are being standardized under the 3rd Generation Partnership Programme (3GPP) and 3GPP2. Various network elements in the IMS architecture will now be described by way of background information.

The Home Subscriber Server (HSS) is a database that stores subscriber data, performs authentication and authorization of subscribers, and can provide the location of a subscriber user terminal to enable mobility. In the description of IMS used by Verizon Wireless™ the HSS is called a Subscriber Data Manager (SDM) and the terms HSS and SDM are used interchangeably in this document.

Call Session Control Functions (CSCFs) are used to manage the establishment and disestablishment of calls or sessions in the network in accordance with the instructions of subscribers and ASs using the Session Initiation Protocol (SIP). In the home network of a subscriber, a network element called the Serving CSCFs (S-CSCF) provides the call and session handling functions for the subscriber. The S-CSCF does not maintain subscriber data locally but queries the HSS for such data using the Cx interface based on the DIAMETER protocol. The interrogating-CSCF (I-CSCF) is the contact point within an operator's network for all connections destined to a subscriber of that network operator, or for a roaming subscriber currently located within that network operator's service area. The Proxy CSCF (P-CSCF) is often the entry into the signaling network, The P-CSCF helps setup and manage sessions, and it forwards messages between IMS networks. It is the first point of contact for a client accessing the IMS network, whether that client is in its home network or roaming in a visited network.

Application Servers (ASs) are used to manage the provision of advanced services to subscribers. ASs may be provided by the network operator and resident in a home network of a subscriber or they may be provided by third parties and in a foreign network. ASs execute applications which provide the control logic for the provision of advanced services such as messaging, conference calling, voice mail, presence services, location based services and so on. Other elements such as media servers may be used to provide some of the required services themselves. ASs may also need to query the HSS for subscriber data and use the Sh interface (which is also based on DIAMETER) to do so.

In the description of IMS used by Verizon Wireless™, there are various network elements known as the Application Manager (AM), Bearer Manager (BM) and Security manager (SM) each of which may query the SDM for subscriber data as well as non-IMS applications. In general, the AMs correspond in 3GPP and 3GPP2 terminology to both CSCFs and ASs.

In some networks, particularly networks with many subscribers or geographically wide spread networks, multiple HSSs are implemented at different physical sites. This can improve capacity, reduce latency and provide redundancy. In one approach (replication), identical subscriber data is stored at all HSS sites and any HSS can service a request in respect of any subscriber. A typical requirement is for dual or triple site deployment. A network element can interact with any site but typically uses nearest for lower latency. In another approach (partitioning), each HSS site is responsible for a subset of the entire subscriber data for the network. Redundancy may still be employed, but deployment is partition specific. A network element must query an HSS site (partition) responsible for the associated subscriber. Accordingly, a routing function is needed to map the subscriber data requests of network elements to the correct FISS. In 3GPP and 3GPP2 IMS, this routing function is called the Subscriber Location Function (SLF). The SLF and HSS communicate using the DIAMETER protocol.

Figure 1:
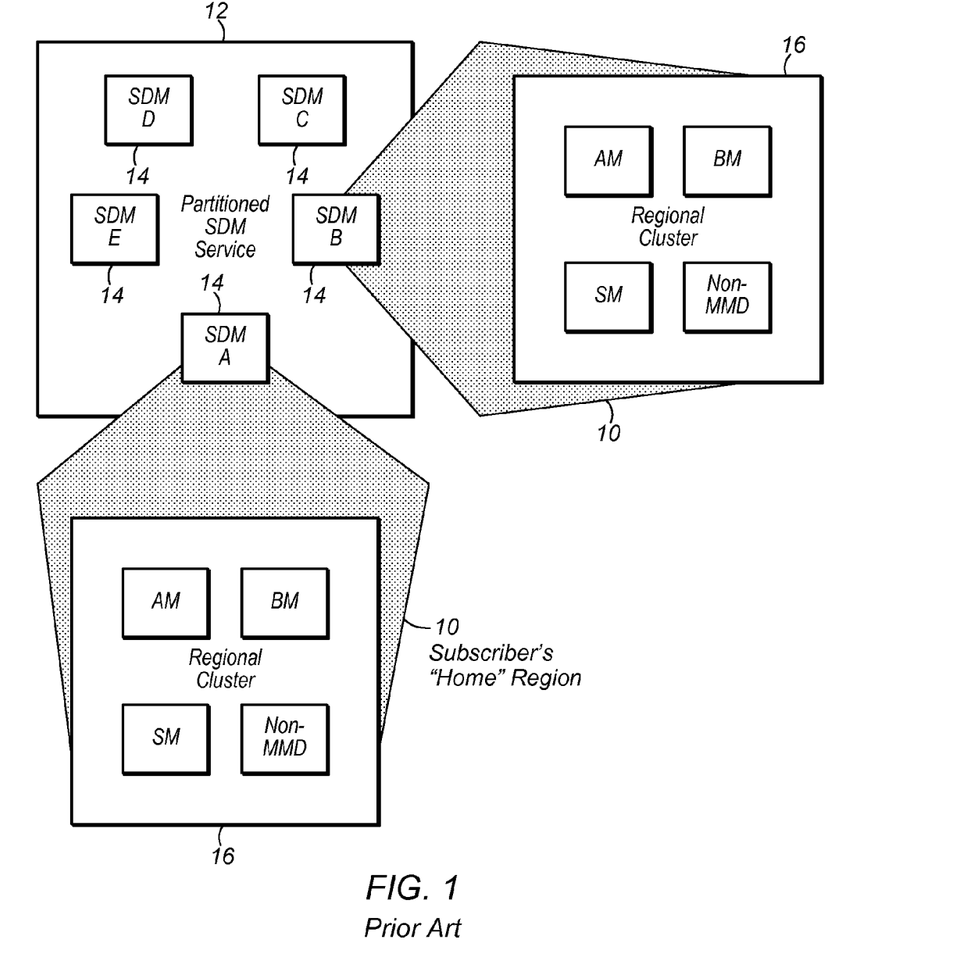
FIG. 1 shows an exemplary implementation of a partitioned SDM (ie HSS) in a large communications network according to the prior art.

FIG. 1 shows an exemplary implementation of a partitioned SDM (ie HSS) in a large communications network. The network is divided into a number (in this case 5) geographic regions 10 (only two shown) each having an SDM 14—ie SDMs A, B, C, D and E—forming a partitioned SDM service 12. Each SDM acts as home SDM for subscriber's resident in it's geographic region. Multimedia and data (MMD) services are provided by AM, BM and other functional elements in each geographic region's cluster 16. A subscriber will always register with their home SDM. The assumption is that vast bulk of subscriber activity will be in home region and so interaction will be with home region elements (AM, BM etc). However, network elements in any region will need to access the subscriber's SDM to terminate sessions to that subscriber and also to support subscriber registration due to roaming between regions, for example. Elements will need to have requests routed to the correct (home) SDM and so an SLF is used.

Figure 2:
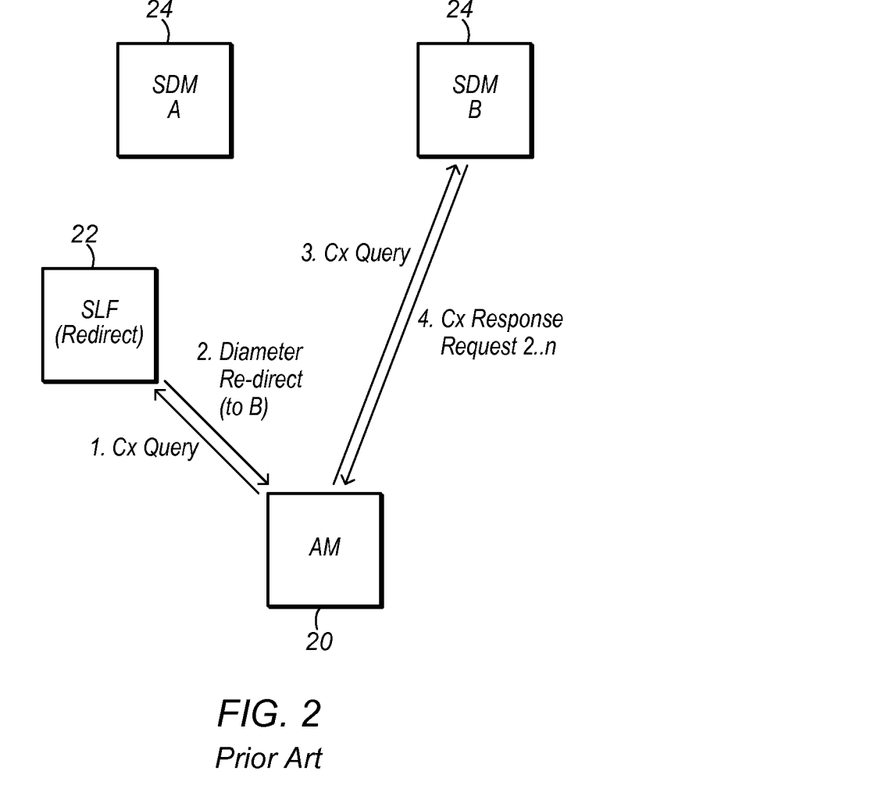
FIG. 2 shows the functioning of re-direct SLF according to the prior art.

According to present IMS standards, the SLF receives SDM queries and redirects the querying network element to the appropriate SDM. For example, 3GPP (23.228, 29.228 and 29.329) identifies an SLF which operates as a Cx and Sh re-direct routing service. As shown in FIG. 2 at step 1, a network element AM 20 sends the intended Cx/Sh query to SLF 22. The SLF uses an internal routing table to return a Diameter redirect reply providing the address of the appropriate SDM 24—in this example SDM B—to handle the Cx query (step 2). At step 3, the AM resends the Cx/Sh query to SDM B. SDM B then returns the Cx response to the AM (step 4). Note that the SLF is a distinct Diameter service requiring each AM to maintain separate SLF and SDM sessions. Typically, AMs make their first query to the SLF then cache the returned SDM address for use in subsequent queries.

The SLF approach used in present IMS standards suffers from certain drawbacks.

Network complexity can be a problem since the SLF must appear as a distinct service to the SDM and each network element must maintain separate Diameter sessions to the SLF and the SDM Handling a change of the home SDM for a subscriber (as a result of a site failure through disaster or a matter of administrative reorganization) can also be a problem. This requires that each network element that might interact with the SDM on behalf of the subscriber be updated with new Diameter connection to the new SDM. This is a significant processing overhead for each subscriber that is "moved" from one SDM to another and for large subscriber moves a very high processing overhead with impact on latency as well.

Also, using the re-direct routing service forces network elements to be capable of handling Diameter re-direct replies which adds complexity to the network elements. Moreover, increased processing overhead is incurred at the network element as a result of redirection.

An object of the present invention is to provide an improved SLF approach.

SUMMARY OF THE INVENTION

According to a first aspect of the present invention, there is provided a method of handling queries for subscription data for a user of a communications network, comprising the steps of: a Subscriber Location Function (SLF) receiving a query for subscription data for a user from a network element of an Internet Protocol Multimedia Subsystem (IMS) network, the query comprising an identity of the user; the SLF looking up in a database the user identity to identify a subscriber data server in which the user's subscription data can be found; and the SLF proxying the query to the identified subscriber data server.

Advantageously, by proxying the query to the subscriber data server (eg HSS or SDM), the network element (eg CSCF, AS or AM) need not be capable of handling Diameter re-direct replies from the SLF and need not incur the processing overheads involved. The network element need not be aware of any partitioning of the subscriber data service at all. Also, network complexity is reduced since separate Diameter connections (and potentially security associations) need not be maintained between all network elements on the one hand and all subscriber data servers on the other hand. Thus, moving subscribers from one subscriber data server to another is simpler and involve less processing overheads and reduced latency. Thus network operator CAPEX and OPEX may be reduced.

In one embodiment, the method comprises the steps of: the SLF receiving a response to the query; and the SLF sending the response back to the network element.

In one embodiment, the IMS network comprises a plurality of subscriber data servers each holding a subset of the total subscriber data for the network.

In one embodiment, the SLF is co-located with one of the subscriber data servers. Advantageously, co-location provides a reduction in network complexity by reducing the number of discrete elements. Also, since a separate, discrete SLF requires a subset of the subscription data maintained across all partitions (eg a mapping from user identity to subscriber data server) it will require (geo) synchronization and redundancy mechanisms separate and in addition to those already operating in the subscriber data management service. Through co-location, the (geo) synchronization and redundancy mechanisms required for the subscriber data service may be re-used for the subscriber location functions. In another embodiment, the SLF is a stand alone mechanism to the plurality of subscriber data servers.

In one embodiment, the subscriber data server is a Home Subscriber Server (HSS). In one embodiment, the network element is a Call Session Control Function (CSCF). In one embodiment, the network element is an Application Server (AS). In one embodiment, the query is a Cx query. In one embodiment, the query is an Sh query.

Further aspects of the present invention are set out in the appended claims. Further advantages of the present invention will be apparent from the following description.

In order to show how the invention may be carried into effect, embodiments of the invention are now described below by way of example only and with reference to the accompanying figures in which:

DETAILED DESCRIPTION OF THE PREFERRED EMBODIMENTS

Embodiments of the present invention are described below by way of example only. These examples represent the best ways of putting the invention into practice that are currently known to the Applicant although they are not the only ways in which this could be achieved.

Figure 3:
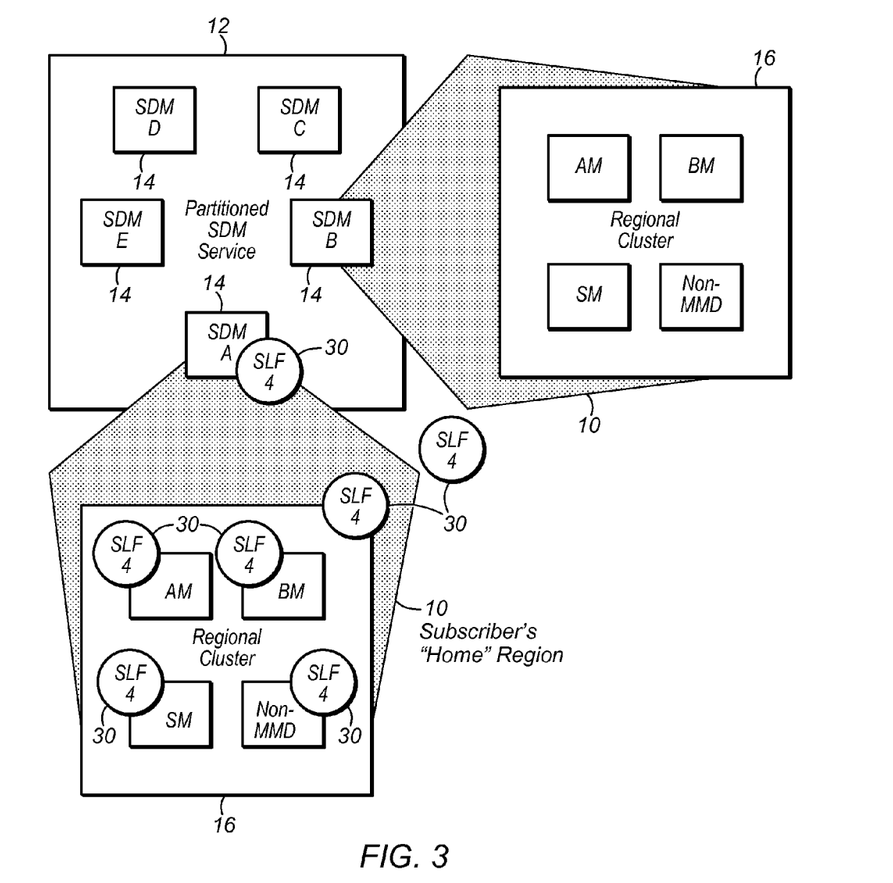
FIG. 3 shows the placement options for a proxy SLF 30 for each geographic region according to the present invention.

FIG. 3 shows the placement options for a proxy SLF 30 for each geographic region according to the present invention. There are four options: 1) network level placement; 2) co-located with the SDM; 3) regional level placement and 4) co-located with each network element.

Placement needs to address two key issues. Network element query latency and data management complexity associated with keeping SLF data in sync with SDM data distribution.

The preferred option is to co-locate the SLF with the SDM (option 2) for the following reasons. Co-locating the SLF with the SDM enables the SLF to use the same data management infrastructure, sharing data, robustness and redundancy mechanisms used by other services at the SDM. Whereas, a separate SLF element means that explicit data synchronization, replication and administration infrastructure/processes are required. Options 1, 3 and 4 compound this functional complexity by increasing the number of SLF's in the network that have to be kept in sync with SDM data. The larger the number the harder it is to ensure all (SLFs and SDMs) are synchronized while avoiding time-based discrepancies. Element co-location (option 4) is the extreme case requiring for example 20 (regions)×4 (SDMs)×3 (element types)=240 relationships to manage over 60 SLFs, excluding any inter-SLF relationships and additional elements introduced at a later date. Furthermore, the bulk of interactions will be between the AM and SDM, and only the first query for a subscriber will involve the SLF. In placing the SLF outside the SDM the trade off is reducing the latency of that initial query against increased distributed data management complexity imposed on the SDMs.

Figure 4:
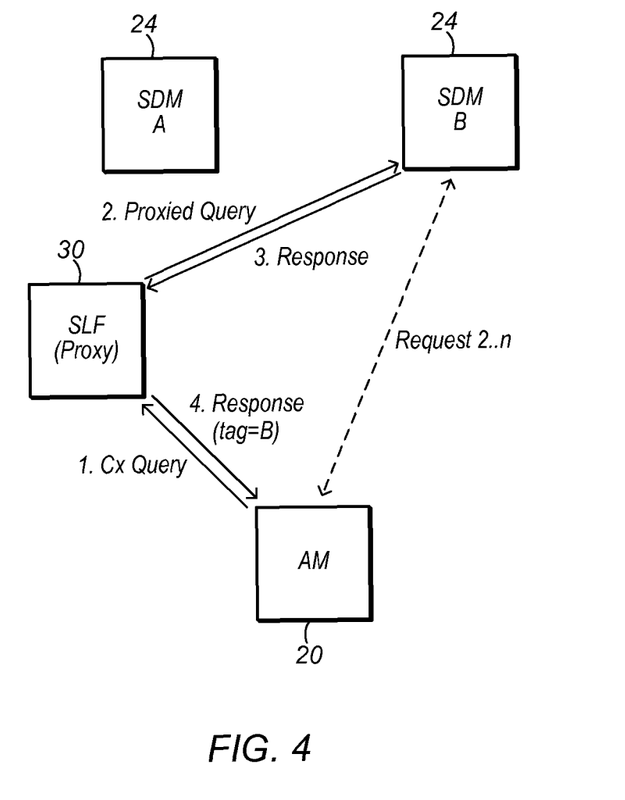
FIG. 4 shows the functioning of proxy SLF 30 according to the present invention.

FIG. 4 shows the functioning of proxy SLF 30 according to the present invention. Note that this figure, and subsequent figures, shows a Cx interaction between AM 20 and an SDM 24. The present invention applies equally to Sh and other interfaces between a network element and subscriber data server in an IMS network.

At step 1, AM 20 sends the Cx query to SLF 30. The query includes as a parameter the identity of the user for whom subscription data is being queried. The SLF looks up the user identity in its database to identify an SDM (SDM B) at which subscription data for the user may be found and at step 2 proxies the Cx query to the identified SDM. At step 3, the SDM returns the Cx response to the SLF which forwards the response to the AM at step 4. Optionally, the SDM adds its address as a new "tag" attribute value pair (AVP) in the response message so that the AM can extract the AVP and cache the SDM address for subsequent queries. Alternatively, the AM can interpret the origin-host AVP and cache the SDM address for subsequent queries without the SDM adding it's address as a new "tag". This enables the AM to send subsequent subscription data queries to the appropriate SDM directly.

As a result, the proxy SLF presents itself to network elements such as the AM as an SDM service, as opposed to the re-direct approach where the SLF presents itself as a separate service. Also, the network elements need not be aware that there is a partitioning of the SDM service.

Figure 5:
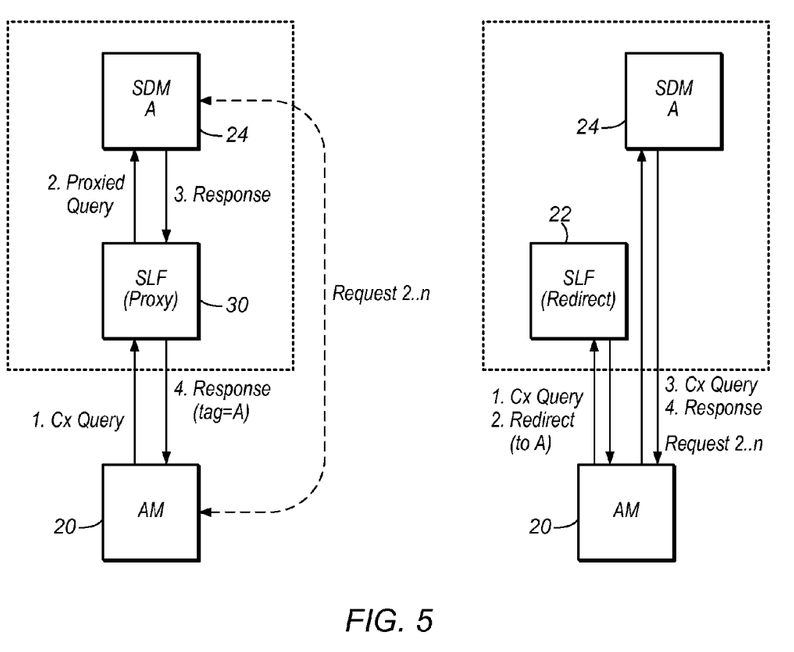
FIG. 5 shows the functioning of a proxy SLF co-located with its regional SDM according to the present invention in contrast to the functioning of a re-direct SLF where queries are for "local" subscribers.

FIG. 5 shows the functioning of proxy SLF 30 co-located with its regional SDM 24 according to the present invention in contrast to the functioning of re-direct SLF 22 where queries are for "local" subscribers. Where the subscriber is in the local SDM, the first query is more efficient in the proxy SLF approach of the present invention since the Cx query is not re-directed back to AM 20 but proxied by SLF 30 to SDM 24—in this case SDM A. Since SDM A and SLF 30 are co-located, this is very efficient. Subsequent queries can be sent to correct SDM based on a "tag" AVP in the Cx response message providing the address of SDM A.

Network architecture is based on assumption that bulk of subscriber activity will be in "home" region and therefore with "home" SDM, so the proxy approach is expected to be more efficient than the re-direct approach in this respect.

Figure 6:
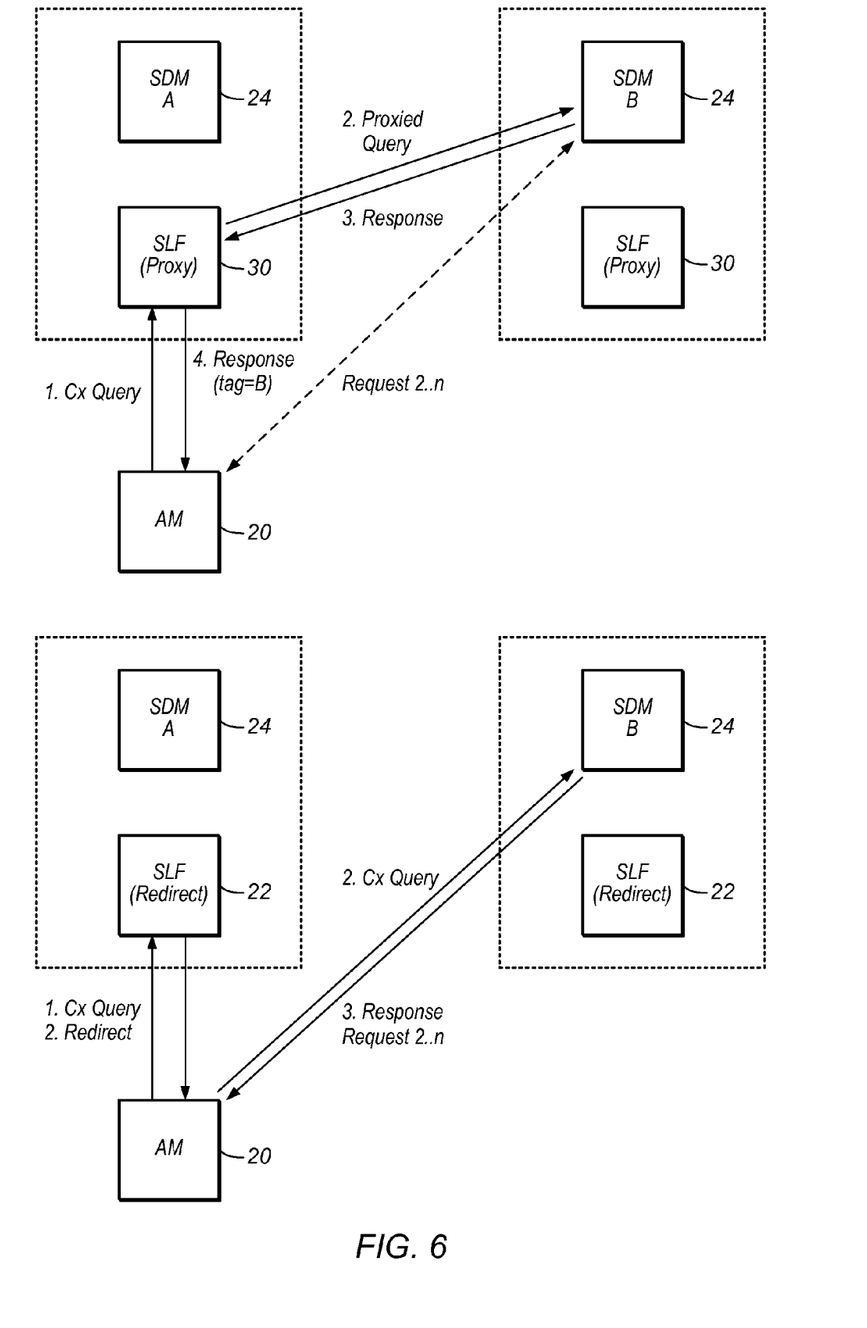
FIG. 6 shows the functioning of a proxy SLF co-located with its regional SDM according to the present invention in contrast to the functioning of a re-direct SLF where queries are for "remote" subscribers.

FIG. 6 shows the functioning of proxy SLF 30 co-located with its regional SDM 24 according to the present invention in contrast to the functioning of re-direct SLF 22 where queries are for "remote" subscribers. Where the AM needs to establish a session to a subscriber in a "remote" SDM region, the first Cx query needs to be routed in either case. According to the present invention, SLF 30 proxies the Cx query to SDM B which returns a response to the AM via the SLF. Optionally, the SDM adds its address as a new "tag" attribute value pair (AVP) in the response message so that the AM can extract the AVP and cache the SDM address for subsequent queries. Alternatively, the AM can interpret the origin-host AVP and cache the SDM address for subsequent queries without the SDM adding its address as a new "tag". It can be seen that both schemes are roughly equivalent in terms of efficiency.

Figure 7:
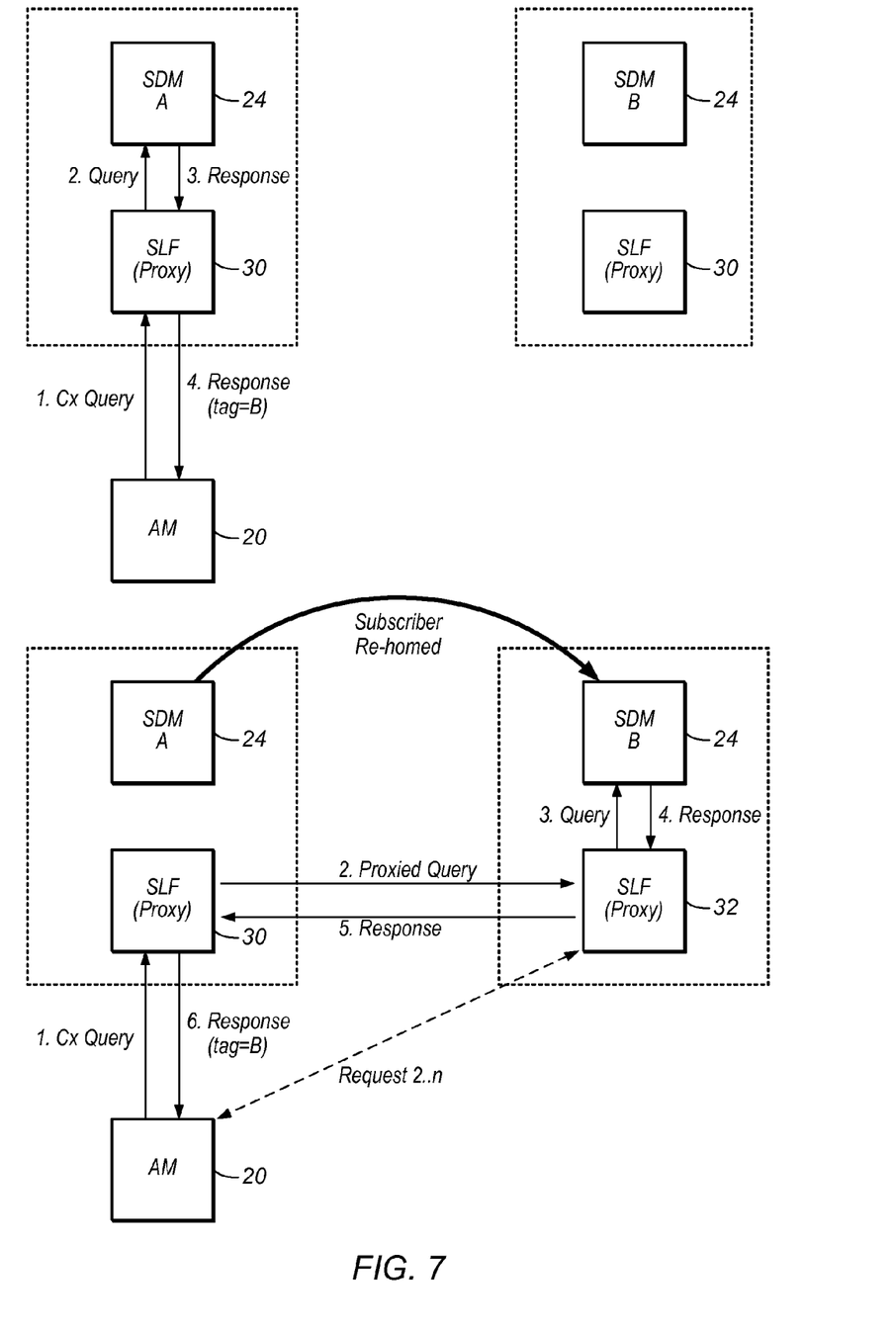
FIG. 7 shows the functioning of an SLF co-located with its regional SDM according to the present invention where subscription data has been re-homed.

FIG. 7 shows the functioning of an SLF co-located with its regional SDM according to the present invention where subscription data has been re-homed. When a subscription record for a user is moved from SDM A to SDM B, proxy SLF 30 provides a means to dynamically inform a network element such as AM 20 of the new SDM address. When AM 20 send its Cx query to proxy SLF 30 co-located with SDM A at step 1 (either because this is its first query or because it has received an error on attempting to direct a query to SDM A directly), SLF 30 proxies (step 2) the query to SLF 32 which forwards (step 3) the query to SDM B. The response is then returned (steps 4-6) to AM 20 via SLFs 32 and 30. Alternatively, SLF 30 may proxy the response directly to SDM B and receive a response directly.

The invention claimed is:

1. A network element, comprising:
   a memory; and
   at least one processor coupled to the memory, wherein the at least one processor is configured to:
      send a query for subscription data for a user to a proxy Subscriber Location Function (SLF), wherein the network element is in an Internet Protocol Multimedia Subsystem (IMS) network, wherein the query comprises an identity of the user, wherein the proxy SLF is configured to proxy the query to a subscriber data server in which the user's subscription data can be found;
      receive a response to the query from the subscriber data server via the proxy SLF including address information for the subscriber data server, wherein the address information comprises an origin-host attribute value pair (AVP); and
      send a subsequent query for subscription data to the subscriber data server using the address information.

2. The network element of claim 1, wherein the IMS network comprises a plurality of subscriber data servers each holding a subset of the total subscriber data for the network.

3. The network element of claim 2, wherein the proxy SLF and HSS are configured to communicate using the DIAMETER protocol.

4. The network element of claim 1, wherein the subscriber data server is a Home Subscriber Server (HSS).

5. The network element of claim 1, wherein the network element comprises a Call Session Control Function (CSCF).

6. The network element of claim 1, wherein the network element comprises an Application Server (AS).

7. A non-transitory computer readable memory medium storing program instructions executable by a processor to:
   receive a query for subscription data for a user from a network element of an Internet Protocol Multimedia Subsystem (IMS) network, the query comprising an identity of the user;
   determine a subscriber data server in which the user's subscription data can be found;
   proxy the query to the identified subscriber data server;
   receive a response to the query from the identified subscriber data server including address information for the subscriber data server; and
   send the response to the query from the identified subscriber data server to the network element including the address information for the subscriber data server, wherein the address information comprises an origin-host attribute value pair (AVP), and wherein the network element is configured to send a subsequent query for subscription data to the identified subscriber data server using the address information.

8. The non-transitory computer readable memory medium of claim 7, wherein the IMS network comprises a plurality of subscriber data servers each holding a subset of the total subscriber data for the network.

9. The non-transitory computer readable memory medium of claim 8, wherein one of the subscriber data servers comprises the processor.

10. The non-transitory computer readable memory medium of claim 8, wherein a stand alone mechanism to the plurality of subscriber data servers comprises the processor.

11. The non-transitory computer readable memory medium of claim 7, wherein the query is a Cx query.

12. The non-transitory computer readable memory medium of claim 7, wherein the query is an Sh query.

13. A method, comprising:
by a proxy subscriber location function (SLF):
receiving a query for subscription data for a user from a network element of an Internet Protocol Multimedia Subsystem (IMS) network, the query comprising an identity of the user;
determining a subscriber data server in which the user's subscription data can be found based on the identity of the user; and
proxying the query to the identified subscriber data server;
receiving a response to the query from the identified subscriber data server including address information for the subscriber data server; and
sending the response to the query from the identified subscriber data server to the network element including the address information for the subscriber data server, wherein the address information comprises an origin-host attribute value pair (AVP), and wherein the network element is configured to send a subsequent query for subscription data to the identified subscriber data server using the address information.

14. The method of claim 13, wherein the IMS network comprises a plurality of subscriber data servers each holding a subset of the total subscriber data for the network.

15. The method of claim 14, wherein the proxy SLF is co-located with one of the subscriber data servers.

16. The method of claim 14, wherein the proxy SLF is a stand alone mechanism to the plurality of subscriber data servers.

17. The method of claim 13, wherein the subscriber data server is a Home Subscriber Server (HSS).

18. The method of claim 13, wherein the network element is a Call Session Control Function (CSCF).

19. The method of claim 13, wherein the network element is an Application Server (AS).

20. The method of claim 13, wherein the proxy SLF and the subscriber data server are configured to communicate using the DIAMETER protocol.

* * * * *